United States Patent
Chen et al.

(10) Patent No.: US 10,740,897 B2
(45) Date of Patent: Aug. 11, 2020

(54) METHOD AND DEVICE FOR THREE-DIMENSIONAL FEATURE-EMBEDDED IMAGE OBJECT COMPONENT-LEVEL SEMANTIC SEGMENTATION

(71) Applicant: BEIHANG UNIVERSITY, Beijing (CN)

(72) Inventors: Xiaowu Chen, Beijing (CN); Jia Li, Beijing (CN); Yafei Song, Beijing (CN); Yifan Zhao, Beijing (CN); Qinping Zhao, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 173 days.

(21) Appl. No.: 15/871,878

(22) Filed: Jan. 15, 2018

(65) Prior Publication Data
US 2019/0080455 A1 Mar. 14, 2019

(30) Foreign Application Priority Data

Sep. 12, 2017 (CN) .......................... 2017 1 0818219

(51) Int. Cl.
*G06K 9/62* (2006.01)
*G06T 7/10* (2017.01)
(Continued)

(52) U.S. Cl.
CPC .................. *G06T 7/10* (2017.01); *G06K 9/00* (2013.01); *G06K 9/00208* (2013.01);
(Continued)

(58) Field of Classification Search
CPC ... G06T 7/10; G06T 2200/04; G06T 2200/08; G06T 7/11; G06K 9/00
See application file for complete search history.

(56) References Cited

U.S. PATENT DOCUMENTS

| | | | |
|---|---|---|---|
| 2015/0112182 A1* | 4/2015 | Sharma | A61B 5/7282 |
| | | | 600/408 |
| 2016/0174902 A1* | 6/2016 | Georgescu | A61B 5/7267 |
| | | | 600/408 |
| 2019/0066373 A1* | 2/2019 | Tran | G06K 9/46 |

FOREIGN PATENT DOCUMENTS

| | | | |
|---|---|---|---|
| CN | 106845529 A | 6/2017 | |
| CN | 106846278 A | 6/2017 | |

OTHER PUBLICATIONS

Garcia-Garcia, Alberto et al., "A Review on Deep Learning Techniques Applied to Semantic Segmentation" 2014 International Conference on Virtual Reality and Visualization on Aug. 31, 2014, pp. 1-23.

(Continued)

*Primary Examiner* — Solomon G Bezuayehu
(74) *Attorney, Agent, or Firm* — J.C. Patents

(57) ABSTRACT

Embodiments of the present invention provide a method and a device for three-dimensional feature-embedded image object component-level semantic segmentation, the method includes: acquiring three-dimensional feature information of a target two-dimensional image; performing a component-level semantic segmentation on the target two-dimensional image according to the three-dimensional feature information of the target two-dimensional image and two-dimensional feature information of the target two-dimensional image. In the technical solution of the present application, not only the two-dimensional feature information of the image but also the three-dimensional feature information of the image are taken into consideration when performing the component-level semantic segmentation on the image, thereby improving the accuracy of the image component-level semantic segmentation.

13 Claims, 11 Drawing Sheets

Acquiring three-dimensional feature information of a target two-dimensional image — S101

Performing a component-level semantic segmentation on the target two-dimensional image according to the three-dimensional feature information of the target two-dimensional image and two-dimensional feature information of the target two-dimensional image — S102

(51) Int. Cl.
*G06N 3/08* (2006.01)
*G06K 9/00* (2006.01)
*G06T 7/11* (2017.01)

(52) U.S. Cl.
CPC ....... *G06K 9/00664* (2013.01); *G06K 9/6274* (2013.01); *G06N 3/08* (2013.01); *G06T 7/11* (2017.01); *G06T 2200/04* (2013.01); *G06T 2200/08* (2013.01); *G06T 2207/20081* (2013.01)

(56) References Cited

OTHER PUBLICATIONS

Guo, Kan et al., "3D Mesh Labeling via Deep Convolutional Neural Networks" Journal of ACM Transactions on Graphics (TOG), vol. 35 Issue 1, Dec. 2015, Article No. 3.
Zhang, Han et al., "Discriminative Feature Learning for Video Semantic Segmentation" 2014 International Conference on Virtual Reality and Visualization on Aug. 31, 2014, pp. 321-326.
The Chinese First Examination Report of corresponding Chinese application No. 201710818219.6, dated Aug. 6, 2019.

* cited by examiner

Acquiring the two-dimensional image corresponding to the respective three-dimensional model according to a perspective projection method — S301

Acquiring the three-dimensional voxel model corresponding to the respective three-dimensional model according to a three-dimensional perspective voxelization method — S302

METHOD AND DEVICE FOR THREE-DIMENSIONAL FEATURE-EMBEDDED IMAGE OBJECT COMPONENT-LEVEL SEMANTIC SEGMENTATION

CROSS-REFERENCE TO RELATED APPLICATION

This application claims priority to Chinese Patent Application No. 201710818219.6, filed on Sep. 12, 2017, which is hereby incorporated by reference in its entirety.

TECHNICAL FIELD

Embodiments of the present invention relate to image processing technology, and in particular, to a method and a device for three-dimensional feature-embedded image object component-level semantic segmentation.

BACKGROUND

Object component semantic information is useful for many visual tasks, for example, image classification when the differences between categories are subtle, and fine-grained motion detection. At the same time, component semantic information is also essential for many robotic tasks involving interaction. For example, when a robot needs to open a hood for repairing a car, the hood is required to be identified correctly. When a robot needs to sit on a chair, a surface of the chair is required to be identified correctly. In summary, component semantic information can be used to accomplish many vision-related tasks.

At present, the method for image object component-level semantic segmentation generally includes three steps as follows: 1) extracting features of each pixel point; 2) acquiring an initial probability distribution belonging to a respective semantic category label of each pixel via a classifier or other models based on the extracted features; and 3) constructing a conditional random field or a Markov random field to optimize the initial probability distribution, thereby acquiring a final semantic category information of each pixel point.

However, during image photographing process, when lighting conditions as well as relative poses or angles of an object and a camera are different, or, for the same kinds of objects, when surface materials and texture properties of the objects are different, the existing method for image object component-level semantic segmentation cannot segment the object component of the image correctly.

SUMMARY

Embodiments of the present invention provide a method and a device for image object component-level semantic segmentation, so as to solve the problem that the existing method for image object component-level semantic segmentation cannot segment an object component of an image correctly.

According to a first aspect, an embodiment of the present invention provides a method for three-dimensional feature-embedded image object component-level semantic segmentation, including: acquiring three-dimensional feature information of a target two-dimensional image;

performing a component-level semantic segmentation on the target two-dimensional image according to the three-dimensional feature information of the target two-dimensional image and two-dimensional feature information of the target two-dimensional image.

According to a second aspect, an embodiment of the present invention provides a device for three-dimensional feature-embedded image object component-level semantic segmentation, including:

an acquiring module for acquiring three-dimensional feature information of a target two-dimensional image;

a processing module for performing a component-level semantic segmentation on the target two-dimensional image according to the three-dimensional feature information of the target two-dimensional image and two-dimensional feature information of the target two-dimensional image.

The method and device for three-dimensional feature-embedded image object component-level semantic segmentation provided in the embodiments of the present invention acquire three-dimensional feature information of a target two-dimensional image, and perform component-level semantic segmentation on the target two-dimensional image according to the three-dimensional feature information of the target two-dimensional image and two-dimensional feature information of the target two-dimensional image. That is, in the method of the present embodiment, not only the two-dimensional feature information of the image but also the three-dimensional feature information of the image is taken into consideration when performing the component-level semantic segmentation on the image, thereby improving the accuracy of the image component-level semantic segmentation.

DESCRIPTION OF EMBODIMENTS

When photographing an image object, it may be in different light conditions, and the relative poses and angles of the object and a camera may also vary. At the same time, even for the same kinds of objects, they may have variously different surface materials and texture properties, as well as different geometric structures. All of these diversities make it a tricky issue to segment an image object component correctly. Taking all these factors into consideration, the root cause of these difficulties is the fact that an object is a three-dimensional model, rather than a two-dimensional image in a real world.

Based on the above analysis, in order to solve the problem in the prior art, the embodiments of the present invention acquire three-dimensional feature information of a two-dimensional image, and perform a component-level semantic segmentation on the two-dimensional image based on the three-dimensional feature information of the two-dimensional image and two-dimensional feature information of the two-dimensional image, thereby improving the accuracy of the segmentation.

The technical solutions of the present invention will be described in detail below with specific embodiments. The following specific embodiments may be combined with each other, and same or similar concepts or processes may not be reiterated in some embodiments.

Figure 1:
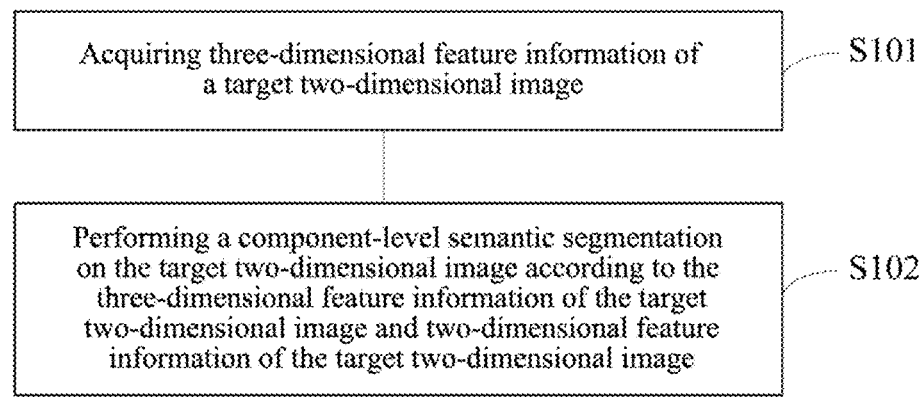
FIG. 1 is a flowchart of a method for three-dimensional feature-embedded image object component-level semantic segmentation provided in a first embodiment of the present invention.

FIG. 1 is a flowchart of a method for three-dimensional feature-embedded image object component-level semantic segmentation provided in a first embodiment of the present invention. An executive body in the present embodiment is a device with a function of image object component-level semantic segmentation, hereinafter referred to simply as a segmentation device. The present embodiment relates to a specific process of the segmentation device to perform a component-level semantic segmentation on a target two-dimensional image according to a three-dimensional feature information of the target two-dimensional image and two-dimensional feature information of the target two-dimensional image. As shown in FIG. 1, the method in the present embodiment may include:

S101: acquiring three-dimensional feature information of a target two-dimensional image.

With a construction of a large-scale three-dimensional model library, such as three-dimensional model library ModelNet and ShapeNet, it is possible to learn a three-dimensional geometric feature from data, which increases three-dimensional feature-oriented learning and application.

The present embodiment may establish a mapping relationship between an image object and a three-dimensional model on the basis of the existing large-scale three-dimensional model library, so as to acquire the three-dimensional feature information of the two-dimensional image.

Alternatively, an image object and its corresponding voxel model are generated using a three-dimensional model, and on this basis, a convolutional neural network is applied to establish a mapping relationship from an image to the voxel model. On the basis of the three-dimensional voxel model, a three-dimensional depth confidence network is used to learn geometric features from the three-dimensional voxel model, so as to acquire the three-dimensional feature voxel model of the two-dimensional image.

Optionally, the present embodiment may also acquire the three-dimensional feature information of the target two-dimensional image according to other methods, which is not limited in the present embodiment.

S102: performing a component-level semantic segmentation on the target two-dimensional image according to the three-dimensional feature information of the target two-dimensional image and two-dimensional feature information of the target two-dimensional image.

Specifically, according to the above steps, after the three-dimensional feature information of the target two-dimensional image is obtained, the three-dimensional feature information of the target two-dimensional image is added to a component-level semantic segmentation process of the target two-dimensional image. The two-dimensional feature information of the target two-dimensional image is simultaneously combined, so as to perform the component-level semantic segmentation on the target two-dimensional image, and further achieve the accuracy of the target two-dimensional image segmentation, thereby enabling multi-vision-related tasks based on component-level semantic information of the target two-dimensional image to be performed accurately.

For example, when a robot needs to open a hood of a car, the robot uses its own camera to photograph the car to acquire an image of the car, and uses the image as a target two-dimensional image in the present embodiment. Then, a segmentation device in the robot, which is located in a processor of the robot, needs to perform a component-level semantic segmentation on the target two-dimensional image to segment the hood. Specifically, three-dimensional feature information of the car image is obtained according to the method of the above step S101. Then, two-dimensional feature information and the three-dimensional feature information of the car image are superposed and filtered, and then the component-level semantic segmentation is performed to accurately segment the hood of the car, so that the robot identifies the hood correctly and opens the hood.

It should be noted that, the segmentation device in the present embodiment may acquire the two-dimensional feature information of the target two-dimensional image according to a method such as rendering. That is, acquiring the two-dimensional feature information of the two-dimensional image belongs to the prior art, and it is not reiterated in the present embodiment.

In an example, the segmentation device in the present embodiment may design a Fully Convolutional Networks (FCN) with two branches. One of the branches is noted as AppNet for extracting two-dimensional feature information from an input two-dimensional image, which can be easily obtained by the existing method (such as residual network); the other branch is noted as GeoNet for extracting three-dimensional feature information of the two-dimensional image. The above AppNet can be obtained by fine-tuning ResNet-101, and the two branches in the FCN network are linked through feature map stitching. In actual use, a target image is inputted into the FCN network, where the AppNet extracts two-dimensional feature information of the target image, and the GeoNet extracts three-dimensional feature information of the target image, and the two-dimensional feature information and the three-dimensional feature information of the target image are combined to achieve a accurate component-level semantic segmentation of the target image.

Optionally, the segmentation device in the present embodiment may achieve a component segmentation of a target two-dimensional image by stitching two-dimensional feature information and three-dimensional feature information of the target two-dimensional image, and then performing a convolutional operation.

It can be seen from the above, in the method of the present embodiment, the three-dimensional feature information of the two-dimensional image is taken into consideration when performing a component-level semantic segmentation on the image, and thus a three-dimensional model of the object in the real environment is restored. In this way, comparing with the existing component-level semantic segmentation based on the two-dimensional feature information of the image, this method makes a segmentation result more accurate and further makes the visual activity based on the segmentation result more accurate.

Figure 2A:
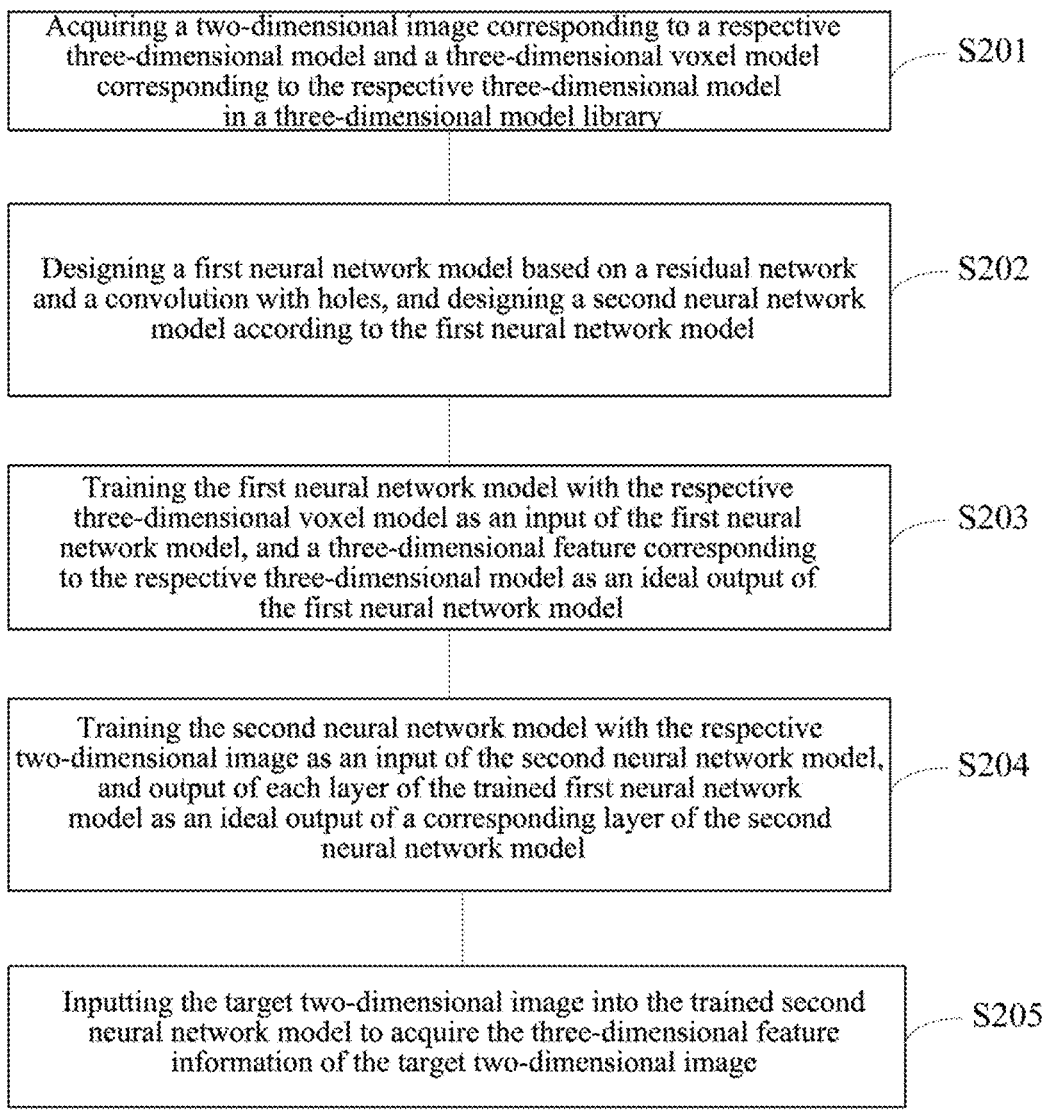
FIG. 2A is a flow chart of a method for three-dimensional feature-embedded image object component-level semantic segmentation provided in a second embodiment of the present invention.

FIG. 2A is a flow chart of a method for three-dimensional feature-embedded image object component-level semantic segmentation provided in a second embodiment of the present invention. On the basis of the above embodiment, the present embodiment relates to a specific process for the segmentation device to acquire the three-dimensional feature information of the target two-dimensional image. As shown in FIG. 2A, the above S101 may specifically include:

S201: acquiring a two-dimensional image corresponding to a respective three-dimensional model in a three-dimensional model library and a three-dimensional voxel model corresponding to the respective three-dimensional model.

Specifically, a certain number of three-dimensional models are stored in the three-dimensional model library in the present embodiment. Optionally, the three-dimensional model library may be a standard three-dimensional model dataset. The three-dimensional model dataset ShapeNet is used to render to generate the two-dimensional image of the respective three-dimensional model. Since the model in the three-dimensional model dataset has component information, its corresponding semantic component segmentation result can also be automatically generated by rendering. That is, the three-dimensional feature information of the respective three-dimensional model in the three-dimensional model dataset can be obtained by rendering.

At the same time, the three-dimensional voxel model of the respective three-dimensional model is obtained by using a method, such as orthogonal projection method or perspective voxelization projection method, where the orthogonal projection method belongs to the prior art and is not reiterated here. The perspective voxelization projection method is described in detail by reference to the following embodiments.

S202: designing a first neural network model based on a residual network and a convolution with holes, and designing a second neural network model according to the first neural network model.

The first neural network model in the present embodiment may be a three-dimensional convolution-based neural network model.

In order to reduce the storage space, preferably, the first neural network model in the present embodiment is a two-dimensional convolution-based neural network model.

It is assumed that an input is a three-dimensional voxel model which is noted as V, a resolution on a depth direction is $n_d$, and a resolution on each voxel plane is k. An output feature map is noted as F, for the sake of simplifying description, the feature map F has the same size as the input three-dimensional voxel model. That is, for the three-dimensional convolution, since the feature map is three-dimensional, the output may be seen as one feature map. For a two-dimensional convolution, since the feature map is two-dimensional, the output may be seen as having $n_d$ feature map. The difference between the two-dimensional convolution-based neural network and the three-dimensional convolution-based neural network is that, the three-dimensional convolution further limits its receptive field in a third dimension and shares weight in that dimension. However, the two-dimensional convolution limits a receptive field and shares weight only in a two-dimensional plane. That is, a calculation result of any three-dimensional convolution can be obtained through a specific two-dimensional convolution, so that the three-dimensional convolution is a special case of the two-dimensional convolution. At the same time, feature maps of the three-dimensional convolution are three-dimensional matrices, and feature maps of the two-dimensional convolution are two-dimensional matrices. Therefore, when the same number of feature maps is used, the storage space required by the two-dimensional convolutional network is significantly less than that required by the three-dimensional convolutional network.

That is, the first neural network model, which is designed based on the two-dimensional convolution in the present embodiment, saves the storage space and improves a calculation speed of an algorithm.

Further, the first neural network model of the present embodiment is designed based on the residual network and the convolution with holes.

Figure 2B:
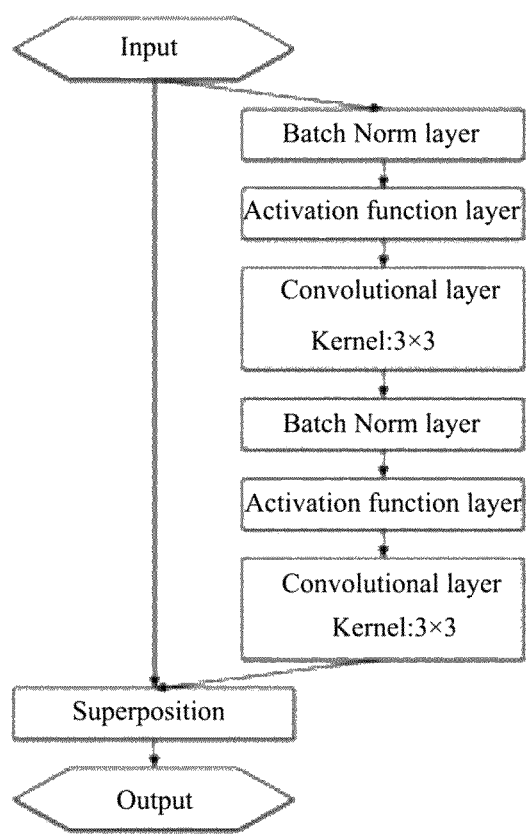
FIG. 2B is a structural schematic diagram of a full pre-activation unit.

Specifically, the first neural network model (hereinafter referred to as VolNet) takes a full pre-activation unit as a basic building unit, and a structure of each full pre-activation unit is shown in FIG. 2B.

In one example, as shown in FIG. 2B (FIG. 2B is a basic structural schematic diagram of the full pre-activation unit), both convolutional kernels of two convolutional layers may be designed as having a size of 3×3, and extended parameter pads are designed as 1. It is noted that a voxel model having high resolution requires very high storage and computational overhead, but provides only limited additional information. Therefore, a resolution for each dimension on a voxel plane is set as one-quarter of a corresponding image. At the same time, in order to reduce the amount of storage and computation, a resolution of a semantic segmentation result is set as one eighth of the input image, and the segmentation result may be restored to the same resolution as the input image through bilinear interpolation.

Optionally, the first neural network model (VolNet) in the present embodiment may include n full pre-activation units, where n is a positive integer greater than or equal to 1. The number of n is not limited in the present embodiment, and is set according to the actual needs.

Figure 2C:
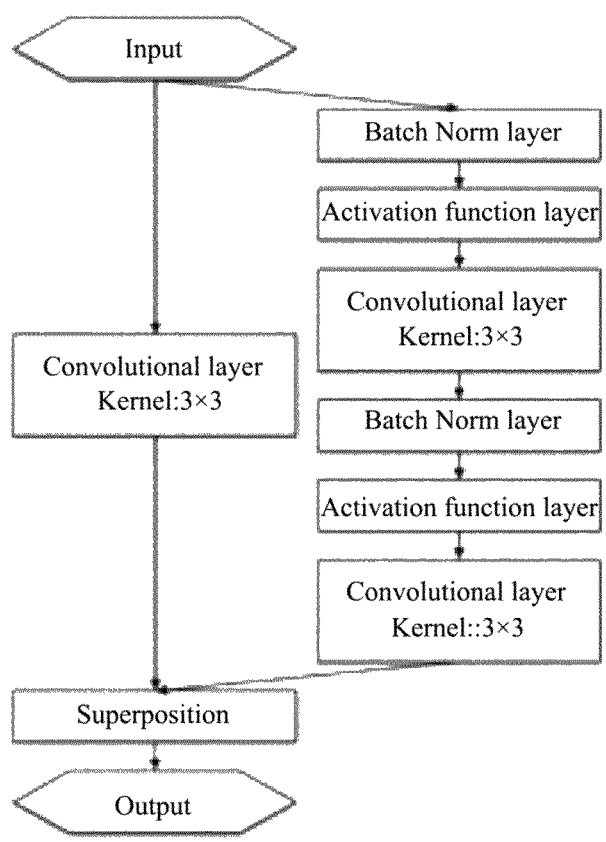
FIG. 2C is a structural schematic diagram of the full pre-activation unit in which a short-circuit connection is a convolutional layer.
Figure 3:
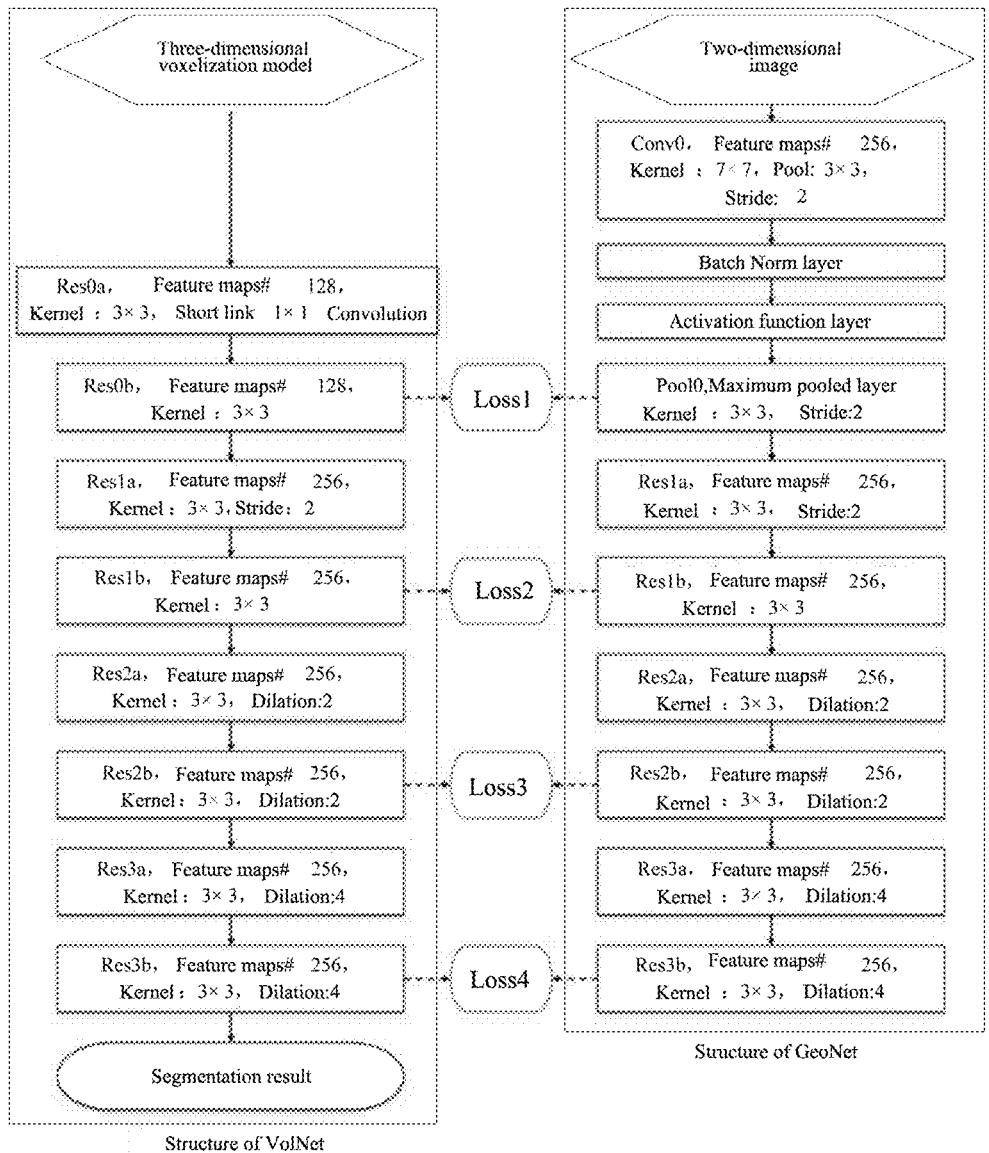
FIG. 3 is a structural schematic diagram of VolNet and GeoNet provided in the second embodiment of the present invention.

In one example, as shown in FIG. 3, the VolNet includes eight full pre-activation units, i.e., Res0*a*, Res0*b*, Res1*a*, Res1*b*, Res2*a*, Res2*b*, Res3*a* and Res3*b*, respectively. In each unit, parameters "feature maps #" represent the number of feature maps, parameters "stride" represent the step size of adjacent operations, and parameters "dilation" are the size of the hole in the convolutional kernel in the convolution with holes. In order to ensure that the input corresponds to the output in terms of resolution, the parameter "stride" of the first convolutional layer is set as 2 in the basic unit Res1a, and thus the size of the feature maps is reduced by half in each dimension. In the basic units Res2a, Res2b, Res3a, Res3b, a convolution with holes is used to acquire a larger receptive field while keeping the output size unchanged, and the parameter "dilation" of the convolution with holes is gradually increased, which are 2, 2, 4, 4, respectively, thereby gradually increasing the receptive field while avoiding the use of deconvolutional layers to restore high-resolution information from a low-resolution feature. For example, the numbers of feature maps of the basic units Res0a and Res0b may be 128, and that of the rest basic units are 256. In addition, in order to match the number and size of the feature maps of the input and output, a convolutional layer having a convolutional kernel size of 1×1 is used as a short-circuit connection in the basic units Res0a and Res1a, the basic structure of which is shown in FIG. 2C. FIG. 2C is a basic structural schematic diagram of the full pre-activation unit in which a short-circuit connection is a convolutional layer. After a VolNet is designed, parameters of the VolNet are kept unchanged, and a second neural network model (hereinafter referred to as GeoNet) is started to be designed. Where the structure and parameters of the GeoNet are the same as those of the VolNet.

The second neural network in the present embodiment is a two-dimensional convolution-based neural network model, and the second neural network model approximates to the first neural network model.

Optionally, when the first neural network model includes n full pre-activation units, the second neural network model may include a convolutional layer, a Batch Norm layer, an activation function layer and m full pre-activation units, where m is less than n, and m is a positive integer greater than or equal to 1.

For example, as shown in FIG. 3, the GeoNet in the present embodiment first includes a convolutional layer, then successively a BatchNorm layer, a ReLU (Rectified Linear Unit) activation function layer, a maximum pooled layer and 6 full pre-activation units. Where an output of the convolutional layer has 128 feature maps, and the convolutional kernel size is 7×7, the pad size is 3, and the stride size is 2. The kernel size of the pooled layer is 3×3, and the stride size is 2. The parameters of the full pre-activation unit in each layer of the GeoNet are the same as those of the full pre-activation unit in the corresponding layer of the VolNet. As shown in FIG. 3, for example, both the parameters in the last layer of the VolNet and GeoNet are feature maps #: 256, kernel: 3×3, dilation: 4.

S203: training the first neural network model by taking the respective three-dimensional voxel model as an input of the first neural network model, and taking a three-dimensional feature corresponding to the respective three-dimensional model as an ideal output of the first neural network model.

After the first neural network model is designed in S202, it begins to train the first neural network model.

Specifically, the three-dimensional voxel model corresponding to the respective three-dimensional model in the three-dimensional model dataset, which is obtained in the above step S201, is taken as the input of the first neural network model, and the three-dimensional feature information corresponding to the respective three-dimensional model is taken as the ideal output of the first neural network model, so as to train the first neural network model.

In the present embodiment, since the first neural network model is a two-dimensional convolution-based neural network model, and the three-dimensional voxel model is a three-dimensional model, in order to enable the two-dimensional convolutional-based neural network model to perform two-dimensional convolutional operation on the three-dimensional voxel model, the present embodiment segments the three-dimensional voxel model in a depth direction of the three-dimensional voxel model to acquire two-dimensional voxel images in different depth directions, and takes the respective two-dimensional voxel image as the input of the first neural network model.

It should be noted that, the three-dimensional voxel model of the three-dimensional model corresponds to the three-dimensional feature information one by one in the present embodiment.

Optionally, the present embodiment may use a cross entropy loss function to train the VolNet, so as to complete the object component semantic segmentation by taking the voxel model as the input.

S204: training the second neural network model by taking the respective two-dimensional image as an input of the second neural network model, and taking output of each layer of the trained first neural network model as an ideal output of a corresponding layer of the second neural network model.

After the second neural network model is designed in S202, and the first neural network model is trained, it begins to train the second neural network model.

Specifically, by adopting a teacher-student strategy, the two-dimensional image corresponding to the respective three-dimensional model in the three-dimensional model library is taken as the input of the second neural network model, and the output of each layer of the trained first neural network model is taken as the ideal output of the corresponding layer of the second neural network model, thereby training the second neural network model by approximating the output of the GeoNet to the output of the network VolNet, so that the GeoNet can extract the three-dimensional geometric feature from the two-dimensional image.

In one example, as shown in FIG. 3, the output of Pool0 layer in the GeoNet is first returned to the output of Res0b in the VolNet to train the Conv0 layer in the GeoNet by minimizing Loss1. The output of Res1b in the GeoNet is then returned to the output of Res1b in the VolNet to train Res1b and its previous layers. Then, the output of Res2b in the GeoNet is then returned to the output of Res2b in the VolNet to train Res2b and its previous layers. Finally, the output of Res3b in the GeoNet is returned to the output of Res3b in the VolNet to train Res3b and its previous layers.

In the above process, when training higher-layers, training results of the lower-layers are used to initialize the corresponding layers, thereby avoiding beginning training from a randomly initialized network every time. With respect to a regression loss function, the present embodiment can choose a mean square error:

$$L = \sum_i \sum_j \frac{1}{2N} (\hat{F}_i^j - F_i^j)^2, (0, 4),$$

where, $\hat{F}_i^j$ is the feature in the GeoNet, and $F_i^j$ is the feature in the VolNet.

S205: inputting the target two-dimensional image into the trained second neural network model to acquire the three-dimensional feature information of the target two-dimensional image.

Specifically, the trained second neural network model is obtained according to the above steps, and the second neural network model may extract the three-dimensional feature information from the two-dimensional image. In this way, when it is needed to acquire the three-dimensional feature information of the target image, it only needs to input the target image into the trained second neural network model, and then, the second neural network model may output the three-dimensional feature information of the target two-dimensional image, so that an accurate component-level semantic segmentation of the target two-dimensional image is achieved by combining the three-dimensional feature information of the target two-dimensional image.

Figures 4, 5:
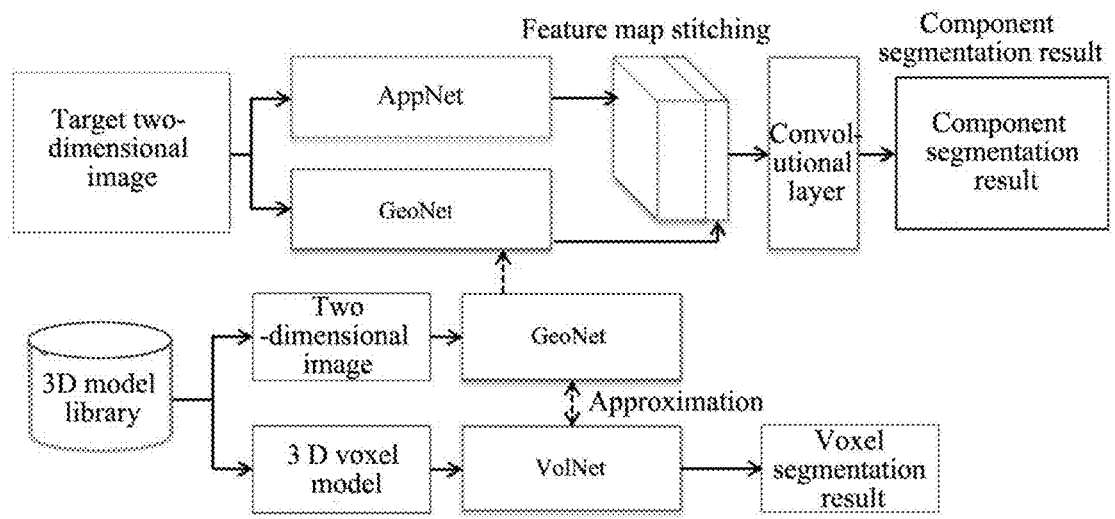
FIG. 4 is a block diagram of the method for three-dimensional feature-embedded image object component-level semantic segmentation provided in the second embodiment of the present invention.
FIG. 5 is a flowchart of a method for three-dimensional feature-embedded image object component-level semantic segmentation provided in a third embodiment of the present invention.

In an example of the present embodiment, as shown in FIG. 4, the method for the image object component-level semantic segmentation in the present embodiment is implemented by an FCN network with two branches. A first branch of the FCN network is called AppNet, which is obtained by modifying a ResNet-101 network pre-trained on a large-scale image dataset ImageNet, and the other branch is GeoNet described above. Where the AppNet is used to extract two-dimensional feature information from a target image, and the GeoNet is used to extract three-dimensional feature information from the target image. The two branches of the networks are linked through feature map stitching, so as to realize an accurate component-level semantic segmentation of the target two-dimensional image.

In a possible implementation of the present embodiment, the respective three-dimensional voxel model is compressed, and the compressed respective three-dimensional voxel model is outputted into the first neural network model.

Further, in order to reduce the storage of the input data, the present embodiment compresses the above-described three-dimensional voxel model by using DCT (Discrete Cosine Transformation). In particular, DCT transformation is applied to each voxel vector $V_i$ to get:

$$F_i = DCT(V_i^k)_{(0,3)}$$

At the same time, the preprocessing operation based on the DCT transformation may also be seen as a convolutional operation, except that a convolutional parameter is fixed. Each DCT component reflects overall information of the voxel vectors along the depth direction in terms of a frequency domain. At the same time, information of low-frequency components is relatively rich, and high-frequency components include more and more noise information. Therefore, in order to reduce storage and improve computational efficiency, the present embodiment may only retain 16 components with the lower frequency. Meanwhile, this operation also has the function of data alignment in the depth direction.

FIG. 5 is a flowchart of a method for three-dimensional feature-embedded image object component-level semantic segmentation provided in a third embodiment of the present invention. On the basis of the above embodiments, the present embodiment relates to a specific process for the segmentation device to acquire the two-dimensional image corresponding to the respective three-dimensional model in the three-dimensional model library and the three-dimensional voxel model corresponding to the respective three-dimensional model. As shown in FIG. 5, the above S201 may specifically include:

S301: acquiring a two-dimensional image corresponding to a respective three-dimensional model according to a perspective projection method.

S302: acquiring a three-dimensional voxel model corresponding to the respective three-dimensional model according to a three-dimensional perspective voxelization method.

The basic principle of the three-dimensional perspective voxelization method includes that: 1) if and only if a voxel $V_i^k$ is inside the three-dimensional model, or intersects with a surface of the three-dimensional model, the voxel $V_i^k$ is set as 1, otherwise the voxel $V_i^k$ is set as 0; 2) a voxel vector $V_i$ along the depth direction corresponds to an image pixel $I_i$, both of which are on a perspective projection line that starts from a source point through the pixel $I_i$ on a imaging plane; 3) if the distances of two voxels to an origin O are the same, that is, the two voxels are on the same depth contour, then they are on the same voxel plane $V^k$.

Figure 6:
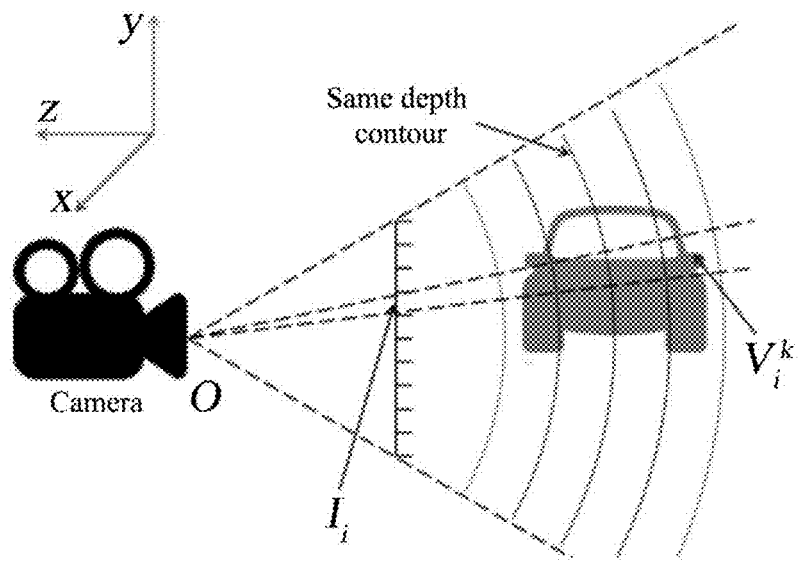
FIG. 6 is a coordinate system schematic diagram of a perspective voxelization algorithm provided in the third embodiment of the present invention.

In the present embodiment, first, a three-dimensional model is rendered using the perspective projection method to acquire the two-dimensional image of the three-dimensional model. Then, the three-dimensional model is rotated and shifted according to external parameters used when rendering the image, so that a relative pose relationship between a camera and the three-dimensional model is the same as that when rendering to generate the image. As shown in FIG. 6, after the three-dimensional model is rotated and shifted, the optical center of the camera is at the origin O of the world coordinate system, and the camera towards a negative direction of z-axis. A perspective projection model is a standard pinhole imaging model. For the convenience of calculation and description, an imaging plane is placed in the negative direction of the z-axis, and the image generated by rendering is noted as I, one of the pixels is noted as $I_i$, the subscript i is an image coordinate, the voxel model is noted as V, one of the voxels is noted as $V_i^k$, the superscript k is a depth coordinate index.

Then, according to three criteria of a three-dimensional perspective voxelization algorithm, a voxel model V is outputted for an inputted three-dimensional model. Where the inputted three-dimensional model is a surface model which takes a triangular facet as a basic unit, the model includes a set of vertex sets V and a set of triangular facets F formed by the set of vertex sets V, and each triangular facet is composed of three vertices $\langle u_0, u_1, u_2 \rangle$ in the vertex sets V. For the camera imaging process, since the standard pinhole imaging model is used, the camera only has an internal parameter of focal length f, a resolution of the image is set as a height of H and a width of W, and a resolution of the voxel model in the depth direction is set as D.

A flow of the three-dimensional perspective voxelization algorithm specifically includes the following steps: first initializing related variables, where each voxel in the voxel model V is initialized as 0, and according to the setting, the resolutions of the voxel model in the height, width and depth directions are $\langle H, W, D \rangle$, respectively; At the same time, the nearest distance $d_{min}$ of all the vertices to the origin O is initialized as infinity, and the farthest distance $d_{max}$ is initialized as 0.

Then, for each vertex u in the three-dimensional model vertex sets V, a distance $d_u$ thereof to the origin O of the coordinate system is calculated, and its coordinate $\langle x_u, y_u \rangle$ on the corresponding imaging plane is calculated according to focal length following the perspective projection principle. In this process, by comparing with the current recorded value, the closest distance $d_{min}$ and the farthest distance $d_{max}$ of all the vertices to the origin O are respectively recorded.

Then, each facet in the set of triangular facets F of the three-dimensional model is iteratively processed until all the facets are properly processed, that is, until F is null. Specifically, a facet $\langle u_0, u_1, u_2 \rangle$ is extracted from the set of triangular facets F of the three-dimensional model and then removed from the set F to avoid being repetitively processed. For the extracted facet $\langle u_0, u_1, u_2 \rangle$, all the voxels that have intersection with the extracted facet need to be set as 1. Therefore, for each vertex $u_j$ of the facet, an image pixel coordinate of a voxel point corresponding to the vertex $u_j$ in the imaging plane is calculated according to the image resolution, and a depth index coordinate of a voxel point corresponding to the vertex $u_j$ in the voxel model is calculated according to the depth resolution, so that the coordinate values of the voxel point are obtained. Then, it is determined that whether the voxel point is inside the three-dimensional model, or intersects with a surface of the three-dimensional model. if the voxel point is inside the three-dimensional model, or intersects with a surface of the three-dimensional model, the voxel point is set as 1; otherwise, the voxel point is set as 0. According to the above methods, each vertex of the respective triangular facet in the respective three-dimensional model is polled to acquire the three-dimensional voxel model corresponding to the respective three-dimensional model.

However, in actual calculation, when a triangular facet is relatively large and its range may span multiple voxels, some voxels may be omitted when processing only based on the facet vertex, resulting in some holes on a surface of the voxel model. With respect to this problem, the present embodiment may divide a larger triangular facet into multiple smaller facets, and adds all of them into the set of facets F.

Therefore, the present embodiment, before voxelizing the three-dimensional model, first determines the size of the triangular facets of the three-dimensional model. Specifically, each edge of the facet is determined, if one edge is likely to span two non-adjacent voxels, then a vertex is added at the center of the edge, so as to divide a triangular facet into two triangular facets. Finally, after the voxels corresponding to the three-dimensional model surface are correctly processed, the voxel in the hole area is filled with 1 by using a morphological method to acquire a final voxel model with a solid inside.

Figure 7:
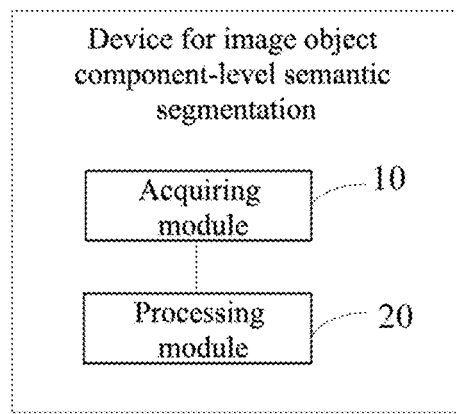
FIG. 7 is a structural diagram of a device for three-dimensional feature-embedded image object component-level semantic segmentation provided in the first embodiment of the present invention.

FIG. 7 is a structural diagram of a device for three-dimensional feature-embedded image object component-level semantic segmentation provided in the first embodiment of the present invention. The device for image object component-level semantic segmentation in the present embodiment may be software, hardware, or a combination thereof. As shown in FIG. 7, the device for image object component-level semantic segmentation in the present embodiment includes:

an acquiring module 10 for acquiring three-dimensional feature information of a target two-dimensional image;

a processing module 20 for performing a component-level semantic segmentation on the target two-dimensional image according to the three-dimensional feature information of the target two-dimensional image and two-dimensional feature information of the target two-dimensional image.

The device for image object component-level semantic segmentation shown in the present embodiment may execute the technical solutions shown in the above method embodiments, and has similar implementation principle and advantage effect, which are not reiterated here.

Figure 8:
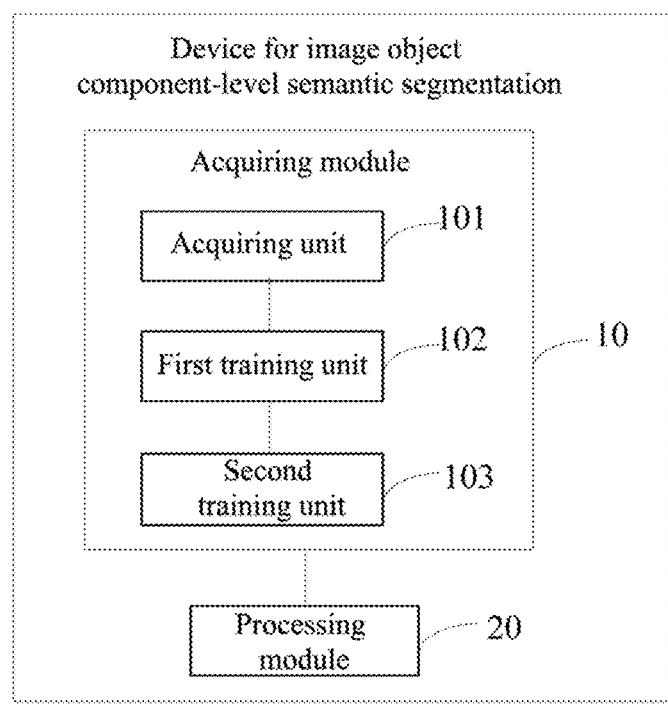
FIG. 8 is a structural diagram of a device for three-dimensional feature-embedded image object component-level semantic segmentation provided in the second embodiment of the present invention.

FIG. 8 is a structural diagram of a device for three-dimensional feature-embedded image object component-level semantic segmentation provided in the second embodiment of the present invention. On the basis of the above embodiments, the acquiring module 10 in the present embodiment includes: an acquiring unit 101, a first training unit 102 and a second training unit 103.

The acquiring unit 101 is used for acquiring a two-dimensional image corresponding to a respective three-dimensional model in a three-dimensional model base and a three-dimensional voxel model corresponding to the respective three-dimensional model.

The first training unit 102 is used for taking the respective three-dimensional voxel model as an input of a first neural network model, and taking a three-dimensional feature corresponding to the respective three-dimensional model as an ideal output of the first neural network model to train the first neural network model.

The second training unit 103 is used for taking the respective two-dimensional image as an input of a second neural network model, and taking output of each layer of the first neural network model trained by the first training unit 102 as an ideal output of a corresponding layer of the second neural network model to train the second neural network model.

The acquiring unit 101 is further used for inputting the target two-dimensional image into the trained second neural network model to acquire the three-dimensional feature information of the target two-dimensional image.

In a possible implementation of the present embodiment, both the above first neural network model and the above second neural network model are two-dimensional convolution-based neural network models.

The device for image object component-level semantic segmentation shown in the present embodiment may execute the technical solutions shown in the above method embodiments, and has similar implementation principle and advantage effect, which are not reiterated here.

Figure 9:
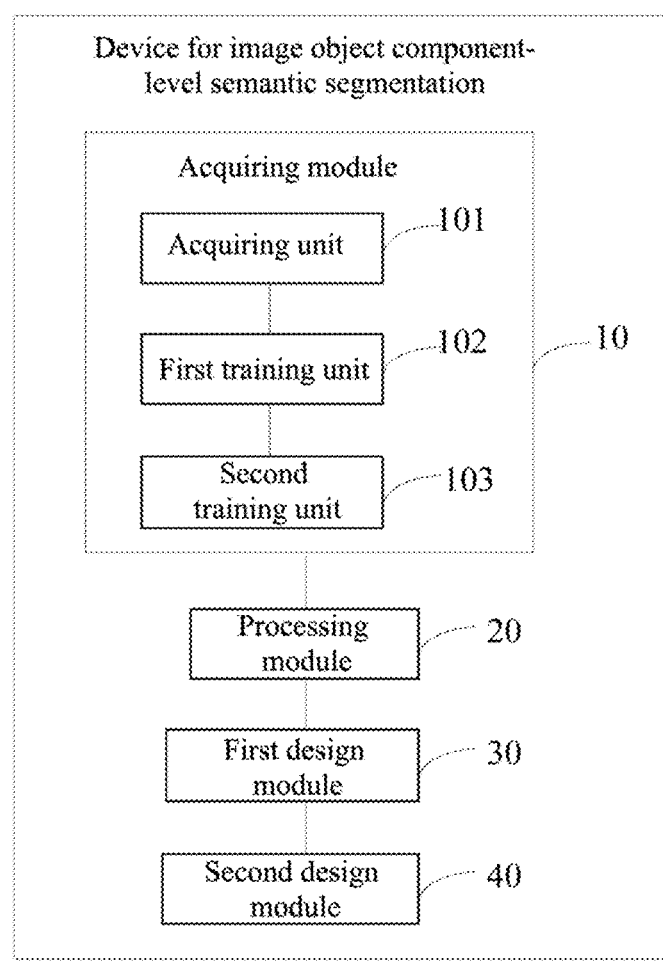
FIG. 9 is a structural diagram of a device for three-dimensional feature-embedded image object component-level semantic segmentation provided in the third embodiment of the present invention.

FIG. 9 is a structural diagram of a device for three-dimensional feature-embedded image object component-level semantic segmentation provided in the third embodiment of the present invention. On the basis of the above embodiments, as shown in FIG. 9, the device for image object component-level semantic segmentation in the present embodiment further includes a first design module 30 and a second design module 40.

The first design module 30 is configured to design the first neural network model based on a residual network and a convolution with holes.

The second design module 40 is configured to design the second neural network model according to the first neural network model, and the second neural network model approximates to the first neural network model.

The device for image object component-level semantic segmentation shown in the present embodiment may execute the technical solutions shown in the above method embodiments, and has similar implementation principle and advantage effect, which are not reiterated here.

Figure 10:
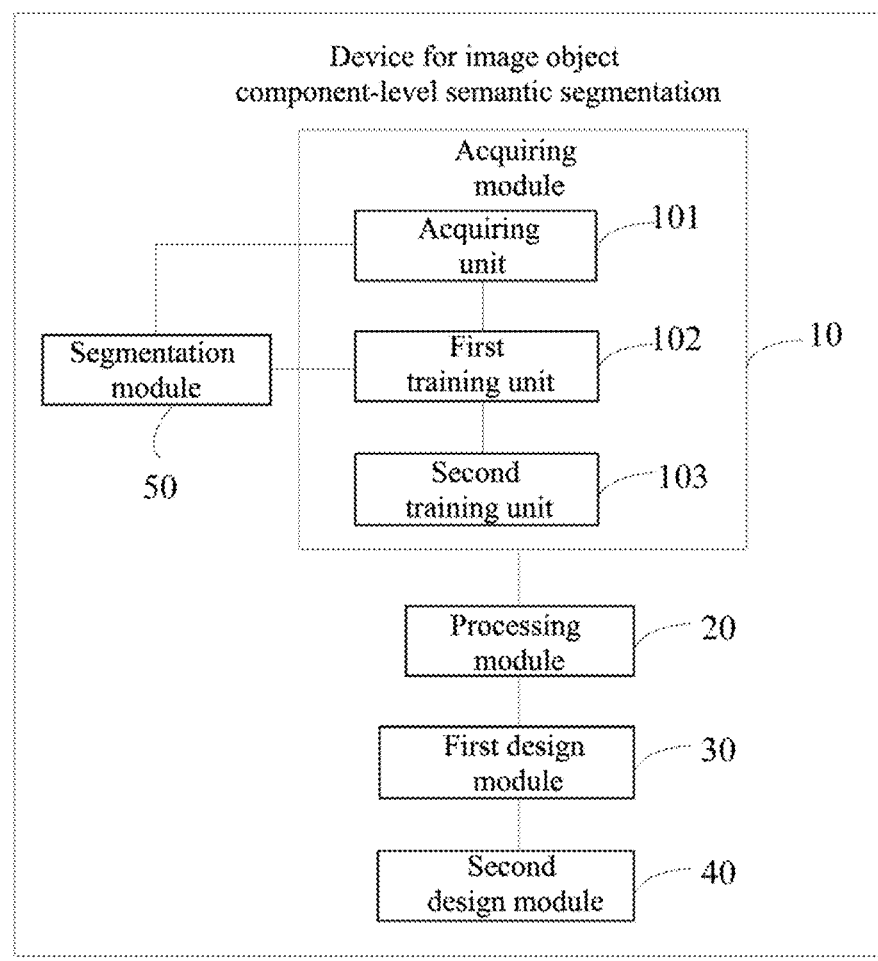
FIG. 10 is a structural diagram of a device for three-dimensional feature-embedded image object component-level semantic segmentation provided in a fourth embodiment of the present invention.

FIG. 10 is a structural diagram of a device for three-dimensional feature-embedded image object component-level semantic segmentation provided in a fourth embodiment of the present invention. On the basis of the above embodiments, as shown in FIG. 10, the device for image object component-level semantic segmentation in the present embodiment further includes a segmentation module 50.

The segmentation module 50 is configured to segment the three-dimensional voxel model in a depth direction of the three-dimensional voxel model to acquire two-dimensional voxel images in different depth directions.

The first training unit 102 is specifically configured to take the respective two-dimensional voxel image as the input of the first neural network model.

In a possible implementation manner of the present embodiment, the acquiring unit 101 is specifically configured to acquire the two-dimensional image corresponding to the respective three-dimensional model according to a perspective projection method; and acquire the three-dimensional voxel model corresponding to the respective three-dimensional model according to a three-dimensional perspective voxelization method; where the three-dimensional perspective voxelization method includes: when a voxel corresponding to the three-dimensional model is inside the three-dimensional model, or intersects with a surface of the three-dimensional model, the voxel is set as 1, otherwise the voxel is set as 0.

The device for image object component-level semantic segmentation shown in the present embodiment may execute the technical solutions shown in the above method embodiments, and has similar implementation principle and advantage effect, which are not reiterated here.

Figure 11:
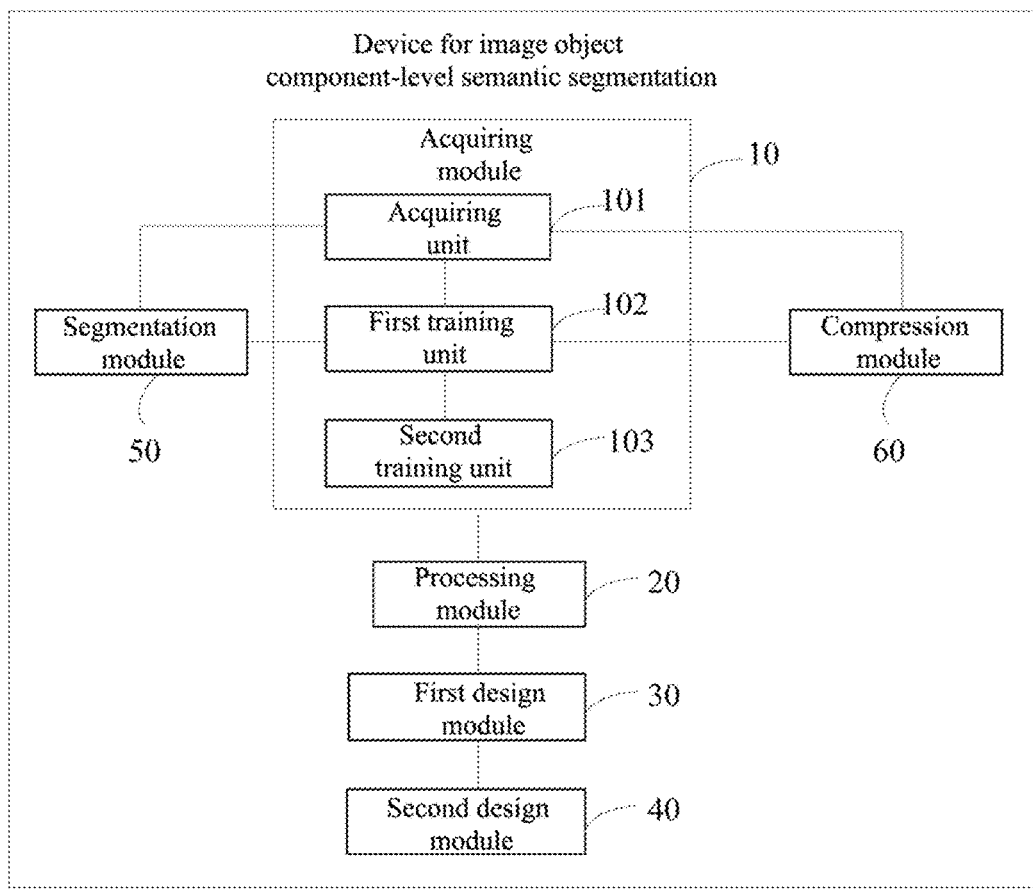
FIG. 11 is a structural diagram of a device for three-dimensional feature-embedded image object component-level semantic segmentation provided in a fifth embodiment of the present invention.

FIG. 11 is a structural diagram of a device for three-dimensional feature-embedded image object component-level semantic segmentation provided in a fifth embodiment of the present invention. On the basis of the above embodiments, as shown in FIG. 11, the device for image object component-level semantic segmentation in the present embodiment further includes a compression module 60.

The compression module 60 is configured to compress the respective three-dimensional voxel model, and output the compressed respective three-dimensional voxel model into the first neural network model.

In a possible implementation of the present embodiment, both the output of the each layer of the trained first neural network model and the output of the corresponding layer of the second neural network model satisfy a mean square error loss.

In another possible implementation of the present embodiment, the first neural network model includes n full pre-activation units;

The second neural network model includes a convolutional layer, a Batch Norm layer, an activation function layer, a maximum pooled layer and m full pre-activation units, where n is greater than m, both n and m are a positive integers greater than or equal to 1.

The device for image object component-level semantic segmentation shown in the present embodiment may execute the technical solutions shown in the above method embodiments, and has similar implementation principle and advantage effect, which are not reiterated here.

The ordinary skilled in the art should understand that all or part of the steps for implementing the above method embodiments may be implemented by instructing a relevant hardware by a program. The aforementioned program may be stored in a computer readable storage medium. The program, when being executed, executes steps including the above method embodiments. The aforementioned storage medium includes various media capable of storing program codes, such as ROM, RAM, a magnetic disk, or an optical disk.

Finally, it should be illustrated that the above embodiments are merely intended for describing the technical solutions of the present invention, but not for limiting the present invention. Although the present invention is described in detail with reference to the aforementioned embodiments, it should be understood by those ordinary skilled in the art that: the technical solutions described in the aforementioned embodiments may still be modified, or equivalent replacements may be made to part or all of the technical features. Those modifications or replacements do not make the essence of the corresponding technical solutions depart from the scope of the technical solutions of the embodiments of the present invention.

What is claimed is:

1. A method for three-dimensional feature-embedded image object component-level semantic segmentation, comprising:

acquiring three-dimensional feature information of a target two-dimensional image;

performing a component-level semantic segmentation on the target two-dimensional image according to the three-dimensional feature information of the target two-dimensional image and two-dimensional feature information of the target two-dimensional image;

wherein the acquiring the three-dimensional feature information of the target two-dimensional image specifically comprises:

acquiring a two-dimensional image corresponding to a respective three-dimensional model in a three-dimensional model library and a three-dimensional voxel model corresponding to the respective three-dimensional model in a three-dimensional model library;

training a first neural network model by taking the respective three-dimensional voxel model as an input of the first neural network model, and a three-dimensional feature corresponding to the respective three-dimensional model as an ideal output of the first neural network model;

training a second neural network model by taking the respective two-dimensional image as an input of the second neural network model, and output of each layer of the trained first neural network model as an ideal output of a corresponding layer of the second neural network model;

inputting the target two-dimensional image into the trained second neural network model to acquire the three-dimensional feature information of the target two-dimensional image.

2. The method according to claim 1, wherein both the first neural network model and the second neural network model are two-dimensional convolution-based neural network models.

3. The method according to claim 2, wherein before taking the respective three-dimensional voxel model as the input of the first neural network model, the method further comprises:

designing the first neural network model based on a residual network and a convolution with holes;

before taking the respective two-dimensional image as the input of the second neural network model, the method further comprises:

designing the second neural network model according to the first neural network model, and the second neural network model approximates to the first neural network model.

4. The method according to claim 3, wherein the taking the respective three-dimensional voxel model as the input of the first neural network model specifically comprises:

segmenting the three-dimensional voxel model in a depth direction of the three-dimensional voxel model to acquire two-dimensional voxel images in different depth directions, and taking the respective two-dimensional voxel image as the input of the first neural network model.

5. The method according to claim 1, wherein the acquiring the two-dimensional image corresponding to the respective three-dimensional model in the three-dimensional model library and the three-dimensional voxel model corresponding to the respective three-dimensional model specifically comprises:
    acquiring the two-dimensional image corresponding to the respective three-dimensional model according to a perspective projection method;
    acquiring the three-dimensional voxel model corresponding to the respective three-dimensional model according to a three-dimensional perspective voxelization method; wherein the three-dimensional perspective voxelization method comprises: when a voxel corresponding to the three-dimensional model is inside the three-dimensional model or intersects with a surface of the three-dimensional model, the voxel is set as 1, otherwise the voxel is set as 0.

6. The method according to claim 1, wherein before taking the respective three-dimensional voxel model as the input of the first neural network model, the method further comprises:
    compressing the respective three-dimensional voxel model, and outputting the compressed respective three-dimensional voxel model into the first neural network model.

7. The method according to claim 2, wherein before taking the respective three-dimensional voxel model as the input of the first neural network model, the method further comprises:
    compressing the respective three-dimensional voxel model, and outputting the compressed respective three-dimensional voxel model into the first neural network model.

8. The method according to claim 3, wherein before taking the respective three-dimensional voxel model as the input of the first neural network model, the method further comprises:
    compressing the respective three-dimensional voxel model, and outputting the compressed respective three-dimensional voxel model into the first neural network model.

9. The method according to claim 4, wherein before taking the respective three-dimensional voxel model as the input of the first neural network model, the method further comprises:
    compressing the respective three-dimensional voxel model, and outputting the compressed respective three-dimensional voxel model into the first neural network model.

10. The method according to claim 5, wherein before taking the respective three-dimensional voxel model as the input of the first neural network model, the method further comprises:
    compressing the respective three-dimensional voxel model, and outputting the compressed respective three-dimensional voxel model into the first neural network model.

11. The method according to claim 1, wherein both the output of the each layer of the trained first neural network model and the output of the corresponding layer of the second neural network model satisfy a mean square error loss.

12. The method of claim 3, wherein the first neural network model comprises n full pre-activation units;
    the second neural network model comprises a convolutional layer, a Batch Norm layer, an activation function layer, a maximum pooled layer and m full pre-activation units, wherein n is greater than m, both n and m are a positive integers greater than or equal to 1.

13. A device for image object component-level semantic segmentation, comprising a processor, configured to:
    acquire three-dimensional feature information of a target two-dimensional image;
    perform a component-level semantic segmentation on the target two-dimensional image according to the three-dimensional feature information of the target two-dimensional image and two-dimensional feature information of the target two-dimensional image;
    wherein the processor is further configured to:
    acquire a two-dimensional image corresponding to a respective three-dimensional model in a three-dimensional model library and a three-dimensional voxel model corresponding to the respective three-dimensional model in a three-dimensional model library;
    train a first neural network model by taking the respective three-dimensional voxel model as an input of the first neural network model, and a three-dimensional feature corresponding to the respective three-dimensional model as an ideal output of the first neural network model;
    train a second neural network model by taking the respective two-dimensional image as an input of the second neural network model, and output of each layer of the trained first neural network model as an ideal output of a corresponding layer of the second neural network model;
    input the target two-dimensional image into the trained second neural network model to acquire the three-dimensional feature information of the target two-dimensional image.

* * * * *